United States Patent [19]
Holt

[11] 3,780,367
[45] Dec. 18, 1973

[54] WINDSCREEN WIPING SYSTEMS FOR ROAD VEHICLES

[75] Inventor: William David Holt, Colne, England

[73] Assignee: Joseph Lucas (Industries) Limited, Birmingham, England

[22] Filed: May 18, 1971

[21] Appl. No.: 144,613

[30] Foreign Application Priority Data
June 9, 1970  Great Britain.................. 27,810/70

[52] U.S. Cl............................. 318/444, 15/250.13
[51] Int. Cl............................ H02p 1/04, B60s 1/08
[58] Field of Search...................... 318/DIG. 2, 443, 318/444; 15/250.13, 250.17

[56] References Cited
UNITED STATES PATENTS

| | | |
|---|---|---|
| 3,609,496 | 9/1971 | Peroy.................................. 318/444 |
| 3,335,352 | 8/1967 | Neapolitakis........................ 318/443 |
| 3,579,067 | 5/1971 | Riester................................ 318/444 |
| 3,593,090 | 7/1971 | Kearns................................ 318/444 |

*Primary Examiner*—Bernard A. Gilheany
*Assistant Examiner*—Thomas Langer
*Attorney*—Holman & Stern

[57] ABSTRACT

In a windshield wiping system for a road vehicle a wiper motor has associated therewith a manually operable switch having an off position and an on position in which it energises the wiper motor. The switch has a further position in which it energises the motor so that there is a delay between successive wipes, and movement of the switch to said further position operates means for operating the wiper motor for a number of cycles before the intermittent action commences.

4 Claims, 1 Drawing Figure

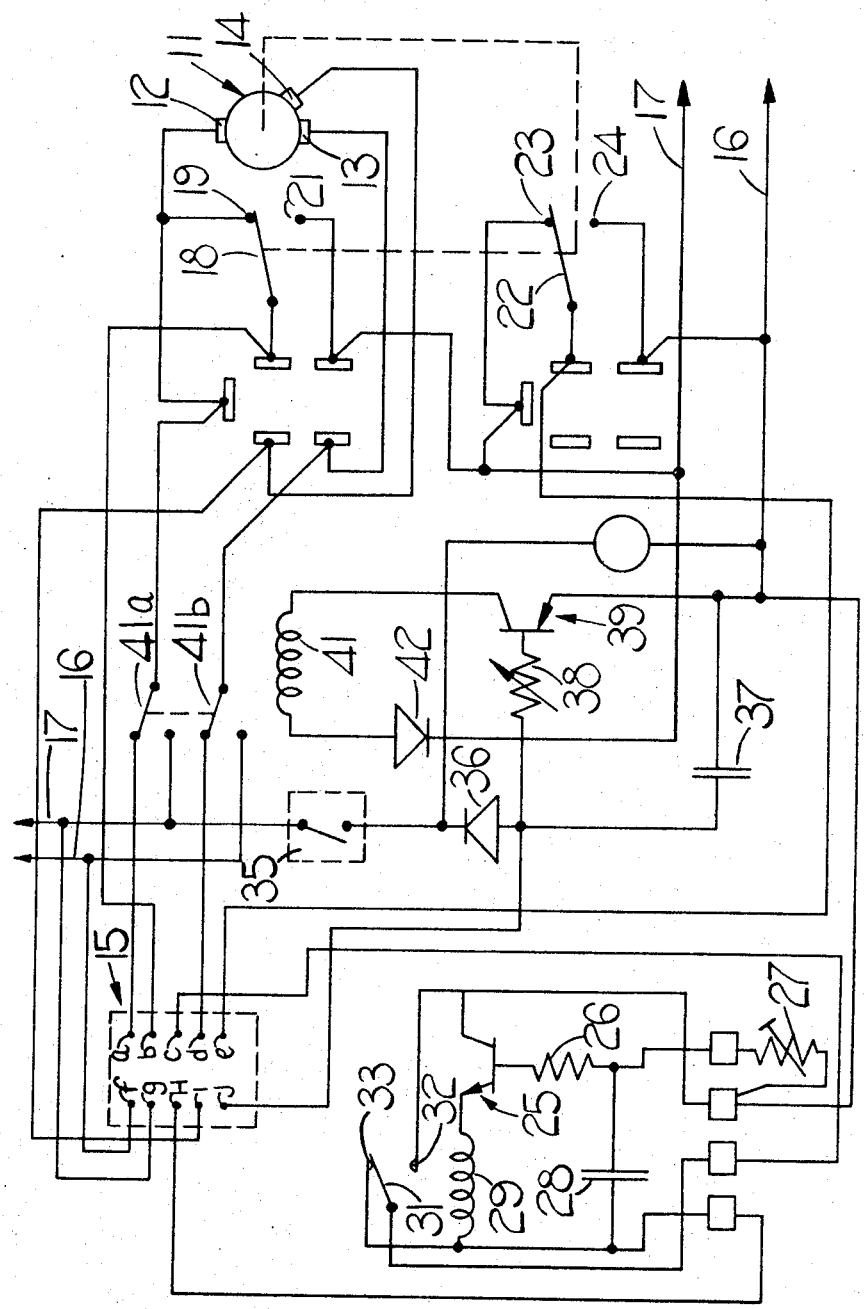

WINDSCREEN WIPING SYSTEMS FOR ROAD VEHICLES

This invention relates to windscreen wiping systems for road vehicles.

A windscreen wiping system according to the invention comprises in combination a wiper motor, a manually operable switch for the wiper motor, the switch having an off position, an on position in which it energises the wiper motor, and a further position in which it energises the motor so that there is a delay between successive wipes, the system further including means operable as the switch is moved to said further position for operating the wiper motor for a number of cycles before the intermittent action commences.

Although the invention can be used in any system having an intermittent wipe position on the control switch, the invention is particularly useful in a system in which the control switch when in its off position serves to reverse the flow of current to the wiper motor to cause the wiper motor to move the wipers clear of the windscreen of the vehicle, at which point a limit switch is tripped to stop the motor. In such a system, the wipers would park clear of the windscreen when the intermittent operation was selected, which is clearly disadvantageous, and in order to prevent this it has been proposed to provide a further limit switch whereby the wipers park on the windscreen when they are operating with a delay. However, it has been found advantageous in such a system to allow the wipers to operate for a few strokes when the intermittent position is selected, so that the mechanism which moves the wipers clear of the windscreen when the switch is in its off position has time to settle down, thereby ensuring that the second limit switch operates satisfactorily to park the wipers on the screen between wipes.

Preferably the system also includes a windscreen washer motor which when energised brings into operation a timing circuit for operating the wipers for a predetermined length of time after the windscreen washer motor is de-energised. In such an arrangement it can be arranged that the same timing circuit is used to operate the wipers for several wipes when the intermittent position is selected.

The accompanying drawing is a circuit diagram illustrating one example of the invention.

Referring to the drawing, a windscreen wiping system includes a two-speed permanent magnet wiper motor 11 having brushes 12, 13, 14, a control switch 15 having ten contacts marked A to J, and positive and negative supply lines 16, 17 which are duplicated at the bottom of the drawing to simplify the drawing. The line 17 is conveniently earthed.

The motor 11 operates a limit switch having a movable contact 18 connected to the contact b. When the wipers operated by the motor are parked off the windscreen of the vehicle, the contact 18 engages a contact 19, but when the wipers are moved onto the screen, the contact 18 engages the contact 21. The contact 21 is connected to the line 17, and the contact 19 is connected to the brush 12. The motor also operates a second limit switch having a movable contact 22 which is connected to the contact e. When the wipers move to a parking position on the windscreen of the vehicle, the contact 22 engages a contact 23 connected to the line 17, but as soon as the wipers move away from their parking position on the windscreen, the contact 22 engages a contact 24 connected to the line 16.

The system further includes a delay unit incorporating an n-p-n transistor 25, the collector of which is connected to the line 16 and the base of which is connected to the line 16 through resistors 26, 27 in series, the resistor 27 conveniently being variable by the driver of the vehicle to select a delay between wipes, in a manner to be described. The junction of the resistors 26 and 27 is connected through a capacitor 28 to the contact H, whilst the emitter of the transistor 25 is connected to the contact H through the coil 29 of a relay, which when energised moves a contact 31 out of engagement with a fixed contact 33 into engagement with a fixed contact 32. The contact 31 is connected to the contact C, the contact 33 is connected to the contact H and the contact 32 is connected to the line 16.

There is further provided a windscreen washer motor 34, one side of which is connected to the line 16 and the other side of which is connected to the line 17 through a switch 35. The junction of the motor 34 and switch 35 is connected through a diode 36 and a capacitor 37 in series to the line 16, the junction of the diode 36 and capacitor 37 being connected through a variable resistor 38 to the base of a p-n-p transistor 39, the emitter of which is connected to the line 16 and the collector of which is connected through a relay winding 41 and a diode 42 in series to the line 17. The winding 41 controls a pair of contacts 41a, 41b, which when the winding 41 is de-energised connect the brushes 12 and 13 respectively to the contacts A and B. When the winding 41 is energised, the contacts 41a and 41b connect the brushes 12 and 13 respectively to the lines 17 and 16. The brush 14 is connected to the contact I.

When it is desired to wash the windscreen, the contact 35 is closed to energise the motor 34 to provide cleansing liquid to the windscreen. At the same time, current flow through the diode 36 charges the capacitor 37, and turns on the transistor 39 to energise the winding 41, which moves the contacts 41a, 41b to the position in which they energise the brushes 12 and 13 to operate the wipers. When the switch 35 is opened again, the motor 34 stops, but the wipers continue to operate until the capacitor 37 has discharged through the base-emitter path of the transistor 39. At this point the contacts 41a and 41b return to the position shown, and assuming that the switch 15 is in its off position at this time, the constacts A and F are interconnected and the contacts D and B are interconnected. Assuming the wipers are at this moment still on the windscreen, then the brush 12 is connected through the contact 41a to the contact A, thence to the contact F which is connected to the line 16. The contact 13 is connected by way of the contact 41b to the contact D, thence to the contact B and through the contacts 18 and 21 to the line 17. Thus, the motor is still energised, but the brushes 12 and 13 are now positive and negative respectively, whereas they were negative and positive respectively when the contacts 41a and 41b were in an energised position. The motor is therefore reversed, and operates in known manner to continue to move the wipers in the same direction, but to cause them to move off the windscreen of the vehicle to a parking position, at which point the contact 18 moves into engagement with the contact 19 so that both brushes 12, 13 are connected to the supply line 17, and the motor ceases to operate.

When the fast speed of the wipers is selected by the switch 15, the contact A is connected to the contact G and the contact I is connected to the contact F. Connection is now made from the supply line 17 through the contacts G and A and the contact 41a to the brush 12, and back from the brush 14 by way of the contacts I and F to the positive line 16, so that the motor operates at its fast speed. When the slow speed is connected, the contacts A and G are again interconnected, so that the brush 12 is connected to the positive supply line, but the contacts D and F are now interconnected, so that the brush 13 is connected by way of the contact 41b and the contacts D,F to the positve line 16. When the switch 15 is returned to its off position from either of these two positions, the wipers are parked off the screen as described above.

When it is desired to operate the wipers with a delay between successive wipes, the switch is moved to its intermittent position in which the contact A is connected to the contact G, the contact D is connected to the contact C and the contact H is connected to the contact E. Ignoring for the moment the contact J, the operation is as follows. When the intermittent position of the switch is selected, the brush 12 is connected by way of the contacts 41, A, G to the negative line 17. The brush 13 is connected by way of the contact 41b, the contacts D,C to the contact 31, which at this stage is also connected to the negative line by way of the contacts 33, H, E, 22, 23 so that the motor does not operate. At this stage, the line 16 is connected by way of the resistor 27, the resistor 26, the base emitter of the transistor 25 and the winding 29 to the contact H, which is connected to the contact E, which is connected to the negative supply line 17 by way of the contacts 22, 23. Thus, the capacitor 28 is slowly charged until the transistor 25 is turned on and energises the winding 29 to operate the contact 31. It will be appreciated therefore that at the beginning of a cycle with the intermittent position selected, still ignoring the contact J, the transistor 25 will be turned on after a fixed time delay to energise the winding 29. The contact 31 will then move out of engagement with the contact 33 breaking the circuit from the line 17, and at the same time the contact 31 will move into engagement with the contact 32 making the circuit from the line 16 through 32, 31 d.c. and 41b to the brush 13, to operate the motor. At the end of the cycle, when the wipers return to their parking position on the windscreen, the contact 32 moves into engagement with the contact 23, breaking the circuit to the brush 13 so that the motor 11 stops, and also breaking the circuit to the base of the transistor 25. However, capacitor 28 is discharging while the transistor 25 is conducting, and charges through the resistor 27 to hold the winding 29 energised for a length of time determined by the charge on the capacitor, which is determined by the resistor 27, which can be varied by the driver. The wipers remain off until the capacitor 28 has charged, at which point the contact 31 moves back into engagement with the contact 32 and another cycle commences.

The switch 15 is movable from the off position in one angular direction to the slow position and then to the fast position, and is movable in the opposite angular direction from the off position to the intermittent position. The switch is so arranged that as it moves from the off position to the intermittent position, it interconnects the contacts G, J momentarily so that the negative supply line 17 is connected to the base of the transistor 39 through resistor 38 to turn on the transistor 39 and charge the capacitor 37. The supply to the base of the transistor 39 from the line 17 will be disconnected immediately as the switch reaches the intermittent position, but the capacitor 37 will discharge to hold on the transistor 39 and to hold energised the winding 41 to operate the motor 11 through the contacts 41a, 41b in the same way as when the motor 34 is operated. This arrangement has the advantage in the system described that it gives the mechanism which parks the wipers off the screen time to settle down so that the parking switch 22 operates satisfactorily. Additionally, however, it is often advantageous to operate the wipers for several cycles at first, even when the intermittent wipe position is selected, so than the windscreen is quickly cleared. For this reason the invention can be applied to systems in which the motor does not park the wipers off the windscreen.

I claim:

1. A windscreen wiping system for a road vehicle, comprising in combination a wiper motor, a manually operable switch for the wiper motor, the switch having an off position, an on position in which it energises the wiper motor, and a further position in which it energises an intermittent wipe means which operates the motor so that there is a delay between successive wipes, the system further including contact means engageable by the movable contact of said switch as said switch is moved to said further position, delay means including a semiconductor switch coupled to said contact means, and said delay means inhibiting said intermittent wipe means for a predetermined period of time so that the wiper motor is operated for a number of cycles before the intermittent action commences.

2. A system as claimed in claim 1 in which the control switch when in its off position serves to reverse the flow of current to the wiper motor to cause the wiper motor to move the wipers clear of the windscreen, at which point a limit switch is tripped to stop the motor, a further limit switch being provided whereby the wipers park on the windscreen when they are operating with a delay.

3. A system as claimed in claim 2 including a windscreen washer motor which when energised brings into operation a timing circuit for operating the wipers for a predetermined legnth of time after the windscreen washer motor is de-energised.

4. A system as claimed in claim 3 in which said timing circuit also constitutes said delay means.

* * * * *